United States Patent
Ur (10) Patent No.: US 10,147,293 B2
(45) Date of Patent: Dec. 4, 2018

(54) COMPUTER-BASED SAFETY CONTROL

(71) Applicant: EMPIRE TECHNOLOGY DEVELOPMENT LLC, Wilmington, DE (US)

(72) Inventor: Shmuel Ur, Galil (IL)

(73) Assignee: Empire Technology Development LLC, Wilmington, DE (US)

(*) Notice: Subject to any disclaimer, the term of this patent is extended or adjusted under 35 U.S.C. 154(b) by 631 days.

(21) Appl. No.: 14/425,591

(22) PCT Filed: Apr. 16, 2014

(86) PCT No.: PCT/US2014/034404
§ 371 (c)(1),
(2) Date: Mar. 3, 2015

(87) PCT Pub. No.: WO2015/160345
PCT Pub. Date: Oct. 22, 2015

(65) Prior Publication Data
US 2015/0364021 A1    Dec. 17, 2015

(51) Int. Cl.
*G08B 21/02* (2006.01)
*F16P 3/14* (2006.01)

(52) U.S. Cl.
CPC .............. *G08B 21/02* (2013.01); *F16P 3/142* (2013.01)

(58) Field of Classification Search
CPC ................................. F16P 3/142; G08B 21/02
USPC .......................................................... 307/328
See application file for complete search history.

(56) References Cited

U.S. PATENT DOCUMENTS

| | | | |
|---|---|---|---|
| 5,796,341 A | 8/1998 | Stratiotis | |
| 6,524,230 B1 | 2/2003 | Harding et al. | |
| 7,230,582 B1 | 6/2007 | Dove et al. | |
| 7,768,549 B2 | 8/2010 | Cofer et al. | |
| 2003/0024992 A1* | 2/2003 | Lewis | G08B 21/02 235/472.01 |
| 2006/0168644 A1 | 7/2006 | Richter et al. | |
| 2008/0111685 A1* | 5/2008 | Olson | G08B 21/02 340/545.6 |
| 2010/0114373 A1 | 5/2010 | Hale et al. | |
| 2012/0146789 A1 | 6/2012 | Deluca et al. | |

(Continued)

FOREIGN PATENT DOCUMENTS

| | | |
|---|---|---|
| EP | 1064783 B1 | 6/2003 |
| EP | 2587792 A1 | 5/2013 |
| WO | 2015160345 A1 | 10/2015 |

OTHER PUBLICATIONS

"Chainsaw safety features," Accessed on http://web.archive.org/web/20130919071909/http://en.wikipedia.org/wiki/Chainsaw_safety_features, last modified on Sep. 18, 2013, pp. 13.

(Continued)

*Primary Examiner* — Fritz M Fleming (57) ABSTRACT

A safety control system, method, and computer system is disclosed for sensing a dangerous device and its environment, analyzing the sensed dangerous device and environment. to determine compliance with a safety precaution. Accordingly, an enabling or disabling signal can then be set to the dangerous device. Examples include using a digital camera sensor and computer vision analysis techniques for dangerous devices such as a chainsaw, welding torch, or a forklift.

17 Claims, 5 Drawing Sheets

(56) References Cited

U.S. PATENT DOCUMENTS

2017/0147161 A1* 5/2017 White .................. H04L 67/02

OTHER PUBLICATIONS

"Injury statistics for welders," Accessed at http://web.archive.org/web/20110404164358/http://www.deir.qld.gov.au/workplace/documents/showDoc.html?WHS%20Publications/manufacturing%20-%20welder, Accessed on Sep. 17, 2014, pp. 2.

"Welder," Accessed at http://web.archive.org/web/20131214224325/http://en.wikipedia.org/wiki/Welder, last modified on Oct. 9, 2013, pp. 5.

International Search Report and Written Opinion in International Patent Application No. PCT/US2014/034404, dated Aug. 29, 2014.

Zaatri, A. et al., "Design and Implementation of a Supervised Intelligent Function," international conference on artifical intelligence, pp. 799-805 (Jun. 26-29, 2000).

\* cited by examiner

COMPUTER-BASED SAFETY CONTROL

CROSS-REFERENCE TO RELATED APPLICATION(S)

This application is the National Stage filing under 35 U.S.C. § 371 of PCT Application Ser No. PCT/US2014/034404, filed on Apr 16, 2014. The PCT Application is herein incorporated by reference, in its entirety, for any purpose.

BACKGROUND

Many industrial machines and tools are known to be dangerous devices unless used in a certain manner specific to the particular machine or tool and task. For example, the brightness of a welding torch may burn the eyes of an operator unless a protective visor is worn, a chainsaw is more likely to cause a kickback injury if not held correctly, and so on. Situations that can create a safety hazard with a single tool can be quite varied. The welding torch, for example, can burn skin with heat or burn eyes with brightness. The procedures or environments necessary to safely use some dangerous dices can be complicated, with long procedural or operational checklists.

Three example dangerous tools are a welding torch, a forklift, and a chainsaw. A common safety protocol for a welding torch includes requiring an operator to wear safety gear or clothing, such as wearing a flameproof glove on the hand not holding the torch, and wearing a mask to protect the operator's eyes from the brightness of the welding point and to protect the rest of the operator's head from flying sparks or other debris. A simple safety protocol for a forklift includes never attempting to pick up an object weighting more than the maximum load for which the forklift is rated. A safety protocol for a chainsaw includes holding the chainsaw correctly with two hands.

Some safety devices can be integrated into a dangerous tool to require conformity with a safety precaution, but there are limits to what can be integrated into the physical tool itself. A typical chainsaw provides an example of both integrated and hard-to-integrate safety precautions, where an appropriate safety precaution involves both operator hands correctly holding both handholds before allowing the chain to rotate. A commonly integrated precaution is built into the throttle of many chainsaws. The throttle is usually a finger trigger located under the rear handhold, and the trigger cannot be engaged unless a lockout switch on the top of the rear handhold is also depressed. Such a configuration generally prevents any chain motion without one of the operator's hands correctly holding the rear handle.

SUMMARY

Embodiments disclosed herein, amongst others, provide a method and apparatus for computer-assisted monitoring of safety precautions related to, for example, the operator of, or the environment of, a device such as a tool or machine. In some embodiments, sensors connected to the computer can observe the operator, the tool, and the environment, and a computer can analyze input from the sensors to ensure a safety protocol is followed, a safety condition is met, or a dangerous condition does not exist. The sensors and computer can be generic to many devices, while the computer instructions that test for a precaution can be tailored to specific tasks or specific models of device. An example of generic sensors and computer is an augmented reality device, such as Google® Glass devices. The result of analyzing the sensor inputs is a safety control signal sent to the dangerous device, which either disables or does not enable potentially dangerous operation of the device. Potentially dangerous operations can thus be prevented when the operator is unaware of nonconformity with a safety protocol or if the operator willfully attempts to circumvent a safety protocol.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components. unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia to methods, apparatus, systems, devices, and/or computer program products related to computer-based safety control.

Despite existing safety precautions, many industrial accidents happen every year resulting in property damage and injury. This suggests that either existing safety precautions could be better followed or better designed. Computer-based safety systems can help do both. Such a system can provide additional checks to help encourage, or require, an operator of dangerous equipment to adhere to existing safety protocols or requirements more closely, and can also perform new safety protocols not previously possible.

Operator limitations is one area where conformity to existing protocols can be improved with a computer-based safety system. While some safety precautions may be obvious, many are not and do not require operator training. And even when a safety precaution is known to an operator, observance of the precaution may not be sufficient when the operator is, for example, tired, rushing, or overly focused on the task of using the tool. The fallibility of an operator using a dangerous tool creates a need for safety protocols and safety devices to increase the degree of compliance and attention to safety precautions. A computer-based safety system can integrate data from a variety of sensors, and use tools such as computer vision to interpret that data, and determine if safety procedures are being followed or not and indicate this to an operator. If enforcement is desired, for example where an operator is likely to have motivation (such as time pressure) to skip safety steps, a computer-based safety system can communicate directly with a dangerous tool or device to disable its operation.

In the chain saw example above, the physical location of the throttle trigger tends to force conformity with the safety precaution requiring operator hand positioning, but only on one hand. There is usually no such integrated lock-out for ensuring the operator's other hand is correctly holding a side handle, as opposed to for example, holding a protective hand guard in front of the side handle or not holding the chainsaw at all with the other hand. A computer-based safety system, such as one that uses a camera sensor and computer vision techniques to recognize and determine the location of the operator's other hand, can help ensure conformity with the existing precaution. This can overcome operator limitations such as accidental holding of the hand guard instead of the handle, or perhaps deliberately attempting to hold some piece of the object being cut by the chainsaw to enable the operator to complete her task more quickly.

New safety procedures can also be performed by computer-based safety systems that could not have been performed by a single operator alone. For example, many dangerous operations should only be done in a clear operating area, free of non-operational objects and humans (that might catch fire or be injured or damaged) within some boundary. An operator is limited to using only the operator's senses from wherever the operator is standing, and it would be preferable for some tasks to have those senses focused on whatever the task is attempting to accomplish with the dangerous tool. A computer-based system can for example place additional sensors, such as camera, infrared, laser, pressure, or motion sensor, at many locations to determine the presence or location of objects or people where the operator cannot see or otherwise sense. Additionally, such a computer based system can allow the operator to safely focus more on whatever task is at hand, such as cutting a log or welding pipe.

Figure 1:
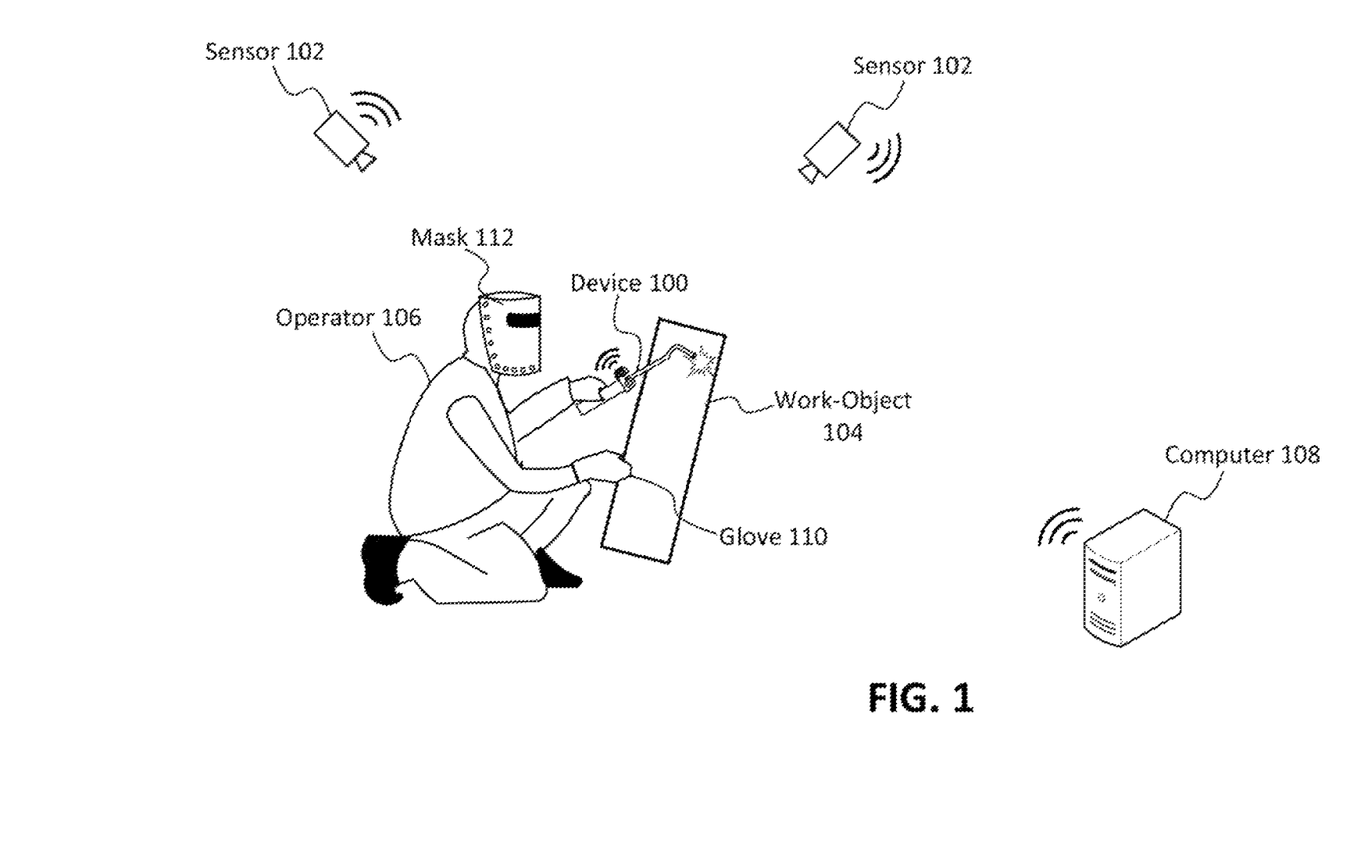
FIG. 1 depicts an illustrative embodiment of a safety control for a welding torch with environment-mounted sensors.

FIG. 1 depicts an illustrative embodiment of a safety control system for a hand-held welding device 100. As depicted, a safety control computer 108 may be wirelessly connected to both device 100 and sensors 102. In the depicted, embodiment, multiple environment-mounted sensors 102 may be used, which could, for example, be mounted to the walls of the room where the dangerous device 100 is used, hence providing multiple observation angles of the work area. An operator 106 may use device 100 to weld a work-object 104. Safety precautions should be taken to protect the operator while welding. Example precautions that should be considered include: wearing a highly insulated and flame resistant glove 110 on the hand that holds or touches work object 104 to prevent burning the hand of operator 106 when it is near the site of welding; and/or wearing, a head covering mask 112 that both protects eyes of operator 106 from extremely bright light at the welding site and protects hair from flying sparks.

Safety control computer 108 may be configured to receive digital signals from sensors 102, and execute instructions to detect whether safety precautions are met based on an analysis of the signals from the sensors 102. When the safety precautions are met, an enablement signal may be generated and sent to device 100, enabling the dangerous operating modes of device 100. Device 100 does not operate when it is not receiving or does not receive the enablement signal. In an alternate embodiment, the safety signal is inverted such that the computer sends only a disablement signal when a dangerous condition is detected, which disables the device or tool.

Generally, sensors produce digital signals indicative of what is sensed, and are communicatively coupled to and may be communicatively coupled to a computer for analysis. Sensors may produce a sample or measurement indicative of the world around the sensor. In FIG. 1, sensors 102 may be cameras that produce digital images, and the analysis of safety precautions may involve standard computer vision techniques for object recognition and material recognition in the digital images. Object recognition may include determining the existence and location in the digital images of, for example, a human form, body parts, such as a head or hand, and device 100. Material recognition may include detecting, for example, the existence and type of a fabric covering a recognized head, and the existence and type of material covering a recognized hand that is near a recognized tool. Processes for determining if safety conditions are met are discussed in more detail below.

The digital connections between sensors 102, device 100, and computer 108 may be made using standard wireless computer networks, such as Bluetooth® or WiFi, and may use custom encryption protocols for privacy and to prevent circumvention of the safety protocol by operators. The encryption protocols for sensors 102 and device 100 may be different from each other, such that sensor 102 encryption protocol is provided by the sensor or safety control system provider, while device 100 encryption protocol is specific to the particular tool being used. For example, the encryption protocol for the tool may be switched as frequently as operator 106 switches the device or tool being used. Device 100 encryption protocol, as well as the safety conditions being tested, can be easily switched by switching the instructions executed by computer 108 when the operator swaps device 100 for a different dangerous device or tool. The instructions that are specific to a particular device or tool can be separate programs or "apps" (applications) provided by the tool manufacturer. Computer 100 can recognize the different devices or tools used by the operator, just as it recognizes body parts, glove 110, and mask 112 using standard computer vision techniques, or the Internet address of the correct application can be the content of a computer readable label or other indicator affixed to each different dangerous device. When a new device or tool is detected, the program or app being used can be automatically switched, hence switching the safety conditions and encryption protocols being used. In an alternate embodiment, multiple devices or tools can be used simultaneously while multiple programs are simultaneously run on one or more safety control computers.

Figure 2:
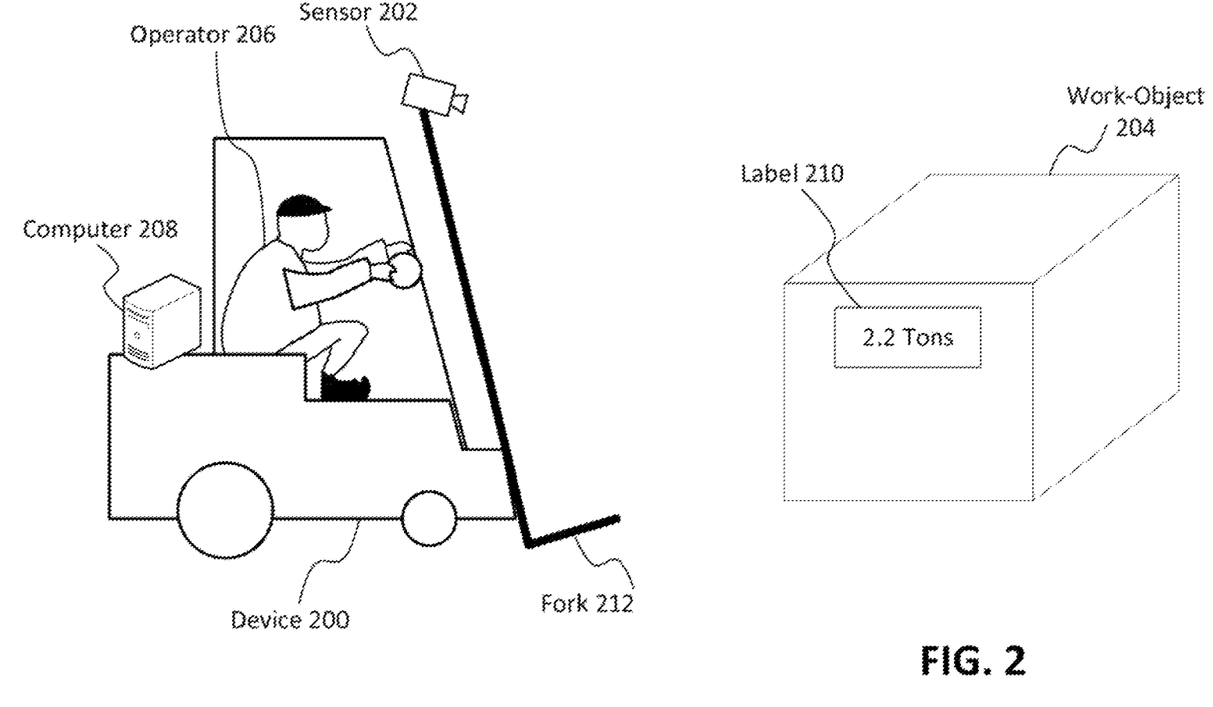
FIG. 2 depicts an illustrative embodiment of a safety control for a forklift with a device-mounted sensor.

FIG. 2 depicts an illustrative embodiment of a safety control system for operating a forklift. In the depicted embodiment. a forklift device 200 may be a forklift, and a sensor 202 may be a camera that is mounted on device 200 itself. The safety analysis may involve analyzing attributes of a work-object 204 instead of attributes of an operator 206 as was done in FIG. 1 above. Such a safety precaution may involve preventing the forklift from attempting to lift objects labeled as weighing more than a maximum allowable load for the forklift. In the embodiment of FIG. 2, this may done by sensor 202 observing the content of a label 210 or other indicator affixed to work-object 204, analyzing the images produced by sensor 202 to determine the value written or indicated on the label by instructions executing on a computer 208 that are tailored to the safety conditions specific to forklift device 200. The instructions may configure or enable computer 208 to identify the region in the images from sensor 202 with a weight label, interpret the weight of work-object 204 from the image of label 210, and compare the work-object 204's weight to the maximum weight allowed for device 200. The label may be in the form of English text, a bar code, or other machine readable format. If label 210 is determined to indicate a weight above the limit for the device or tool, the computer may send a disable signal to device 200, which in turn may partially disable the device or tool, for example, by disabling the ability to raise a fork 212, while not disabling the ability to lower fork 212 or back up the whole forklift device 200. In other embodiments, the label on a work-object may indicate any physical or other attribute of the work-object, such as a physical dimension (e.g., length, height, width), material the work-object is composed of, temperature requirement, or orientation requirement, and the safety analysis is based on the labeled physical or other attribute of the work-object.

Figure 3:
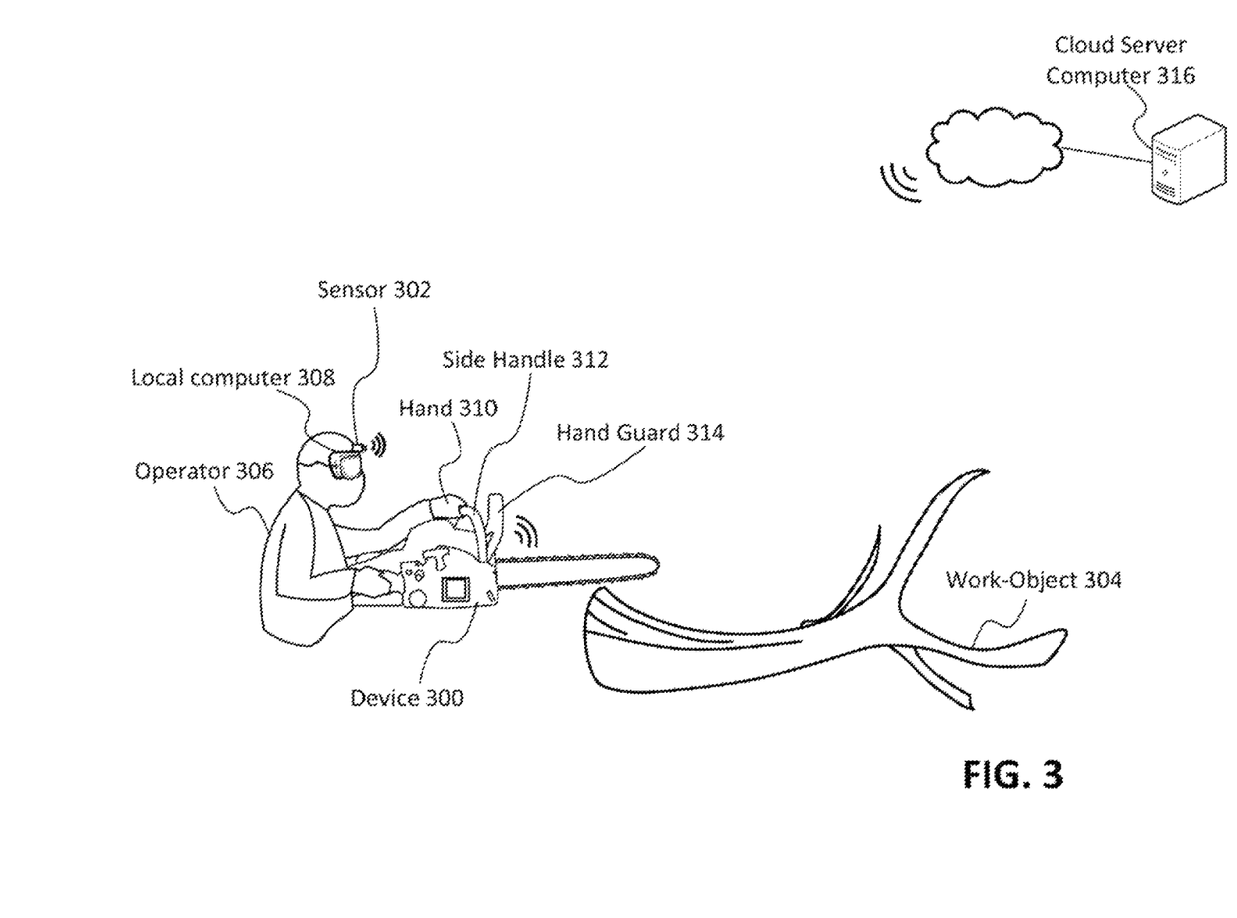
FIG. 3 depicts an illustrative embodiment of a safety control for a chainsaw with an operator-mounted sensor.

FIG. 3 depicts an illustrative embodiment of a safety control for a chainsaw with an operator-mourned sensor. As depicted, a sensor 302 may be mounted on the head of an operator 306 so as to easily observe a hand-held chainsaw device 300, the operator's hands, and a work-object 304. A local, computer 308 in this embodiment may be integrated with head-mounted sensor 302, for example as they are integrated in the Google® Glass concept devices. The instructions that analyze the signal from sensor 302 can be executed on a processor of local computer 308 that may be physically integrated into head-mounted sensor 302, or they can be executed on a remote computer, such as an Internet-connected cloud server 316, or the analysis can be distributed, across multiple computers. In the illustrated embodiment, local computer 308 and sensor 302 are physically wired together, while local computer 308 is wirelessly connected to cloud server 316 and to device 300. The wireless connections may be different types within a single safety control system. For example, the connection to cloud server 316 may be WiFi, while the connection to the device may be Bluetooth®. The safety precaution in the embodiment of FIG. 3 may involve ensuring that a hand 310 of operator 306 that is not positioned on the rear handle is holding a side handle 312. By way of example, hand 310 should not be holding a hand guard 314 or be allowed to go in front of hand guard 314. The analysis can be done by recognizing human hands, side handle 312, and hand guard 314, and then determining whether hand 310 is gripping side handle 312 and is not in from of hand guard 314, for example, by estimating three-dimensional positions of those objects. If a correct or proper positioning of hand 310 cannot be determined, local computer 308 does not send an enable signal to device 300, which prevents the chain on chainsaw device 300 from moving (being operated or functioning).

A computer-based safety control system may also verify or enforce compliance with a procedural or operational checklist prior to enabling operation of a dangerous device. Such a checklist might include a list of activities an operator must perform prior to operation. For example in the embodiment pictured in FIG. 3 with a chainsaw as the dangerous device 300, prior to operation of device 300, a checklist might include verifying the fuel level of the chainsaw and verifying that the operator is wearing steel-toed shoes. As opposed to the hand positioning above which may be monitored continuously during the operation of the device 300, a checklist is not monitored continuously. While the head-mounted camera sensor 302 can be used to verify the fuel and shoes, that sensor may not be able to verify those items during operation for device 300 because the fuel gauge and shoes may not be in the line of sight of the sensor 300 while the chainsaw is operating. Therefore an enablement signal may be determined in part by a checklist of actions or observations performed at a prior time. That prior time might include a time limitation, such that, for example, checking the fuel must be done at least within 15 minutes of operation, and verifying the shoes must be done once a day.

Figure 4:
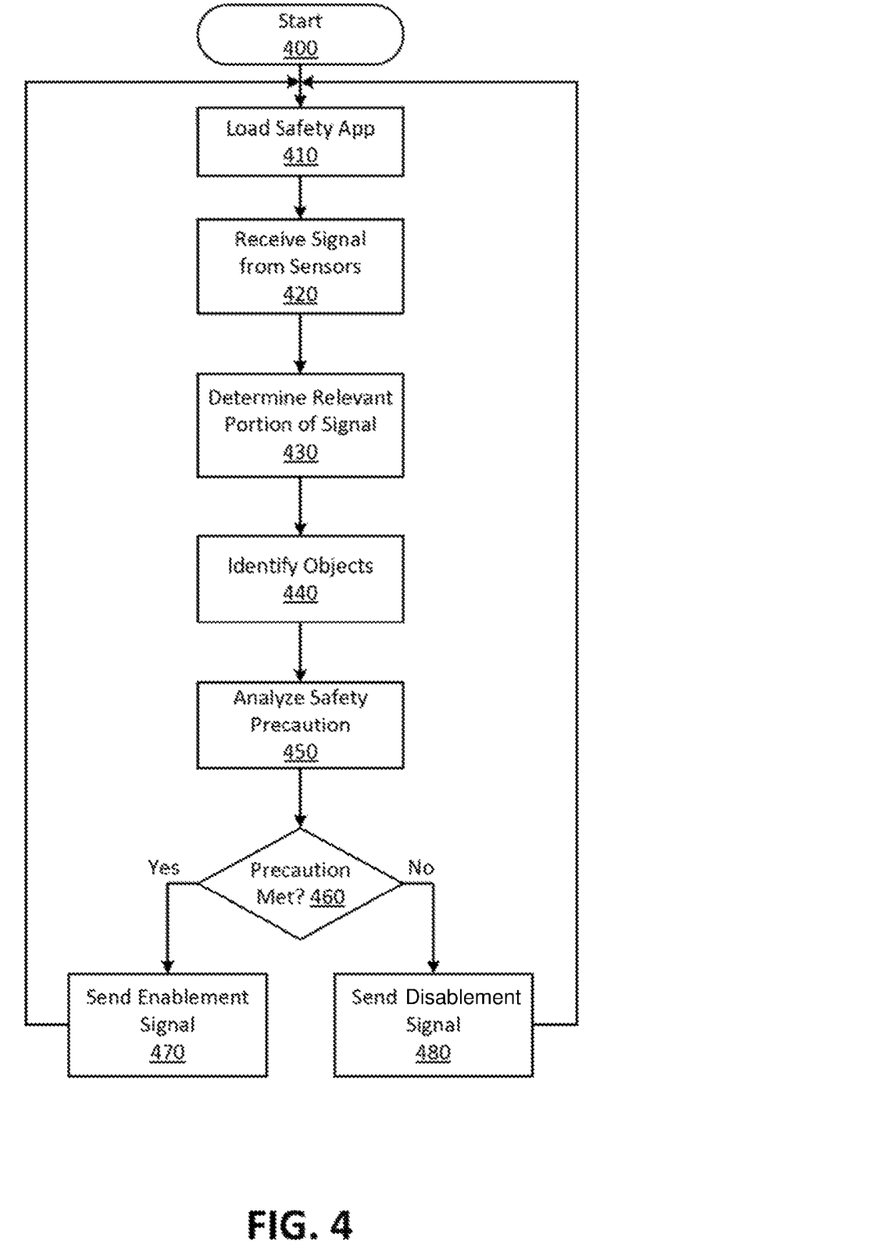
FIG. 4 is a high-level flowchart for an illustrative embodiment of a method of a safety control procedure.

FIG. 4 is a flow chart for an illustrative embodiment of a safety control procedure 400 that may execute on a computer, such as computers 108, 208, or 308. In alternate embodiments, these instructions could be executed on remote computers such as the cloud server 416, or the execution can be distributed across multiple computers, such one or more local computers and one or more cloud servers. Starting at operation 400, the process is initiated by locating and installing the correct safety app 410 comprising the instructions for subsequent operations of this safety control procedure. The correct safety app may include instructions tailored to the specific model of tool, sensor, and computer being used, and can also be specific to the task or environment in which the task is being performed. Any or all of the instructions for the subsequent operations 420-480 can be loaded or replaced at operation 410. For example, in one embodiment of FIG. 3, every time an operator picks tip and starts a chainsaw device 300, the operator may find a label on the device 300 indicating an Internet location for the instruction specific to that model of device 300. The sensor 302 would observe that label, and the computer 308 would retrieve the instructions (possibly in the form of an app with its own user interface or possibly another type of pluggable software module) specific to that model of tool. With this operation 410, one head-mounted safety control device can be used with different models of device 300 and as well as with slightly different safety precautions (for example, requiring an asbestos glove versus a metal glove) or completely different safety precautions (for example, requiring a glove versus enforcing a weight limit).

The next operation 420 in FIG. 4 is to receive the digital images from a camera sensor. In alternative embodiments, there may be multiple camera sensors, sensors that are not cameras, such as microphones, bar code scanners, pressure sensors, proximity sensors, temperature sensors, or simple electric trip switches, or there may be a combination of multiple types of sensors. For example, there may be multiple camera sensors positioned in different locations around a room as in FIG. 1, or there may be two cameras carefully aligned as a stereo vision sensor to be head-mounted similarly to the sensor in FIG. 3. The format of image output from the camera sensors (or other output from any other type of sensor) can be in any digital signal format understood by, and useful for, the instructions used in the subsequent operations of the safety control procedure.

Operations 430-450 interpret the signal received from the sensor or sensors. Operation 430 is optionally a separate operation that identifies the relevant portion of the digital signal which may be further analyzed to determine if a safety precaution is being followed. For example, a safety precaution may only apply at certain times, the relevant portion would be images sampled at the certain times. Or a safety precaution may only apply to a certain area around the dangerous tool (such as a within circle of specified radius around tool, or within a line painted on the floor around the tool), and that certain area would correspond to a certain portion of an image of the area. Operation 440 identifies objects within the region of the image determined at operation 430. For example, the objects identified might be a human figure or body part, or finding a bar code or quick response code (QR code). At operation 450, the compliance with one or more safety precautions may be determined. For example in FIG. 3, the hand 310 and side handle 312, which would have been identified at operation 430, can be analyzed to determine if the hand 310 is correctly holding the side handle 312. Note that while operations 430, 440, and 450 as described above interpret an image from a camera sensor, these operations may be replaced in other embodiments with any operations necessary to interpret any received digital signal to determine if there is compliance with any chosen safety precaution.

Operation 460 determines, based on the result of operation 450, whether a precaution has been met and whether to send an enablement signal to the tool at operation 470 or to send a disablement signal at operation 480. In some embodiments, the disablement signal may simply be the absence of an enablement signal, or vice versa. The enablement signal to the dangerous tool may or may not be encrypted, as discussed above.

Figure 5:
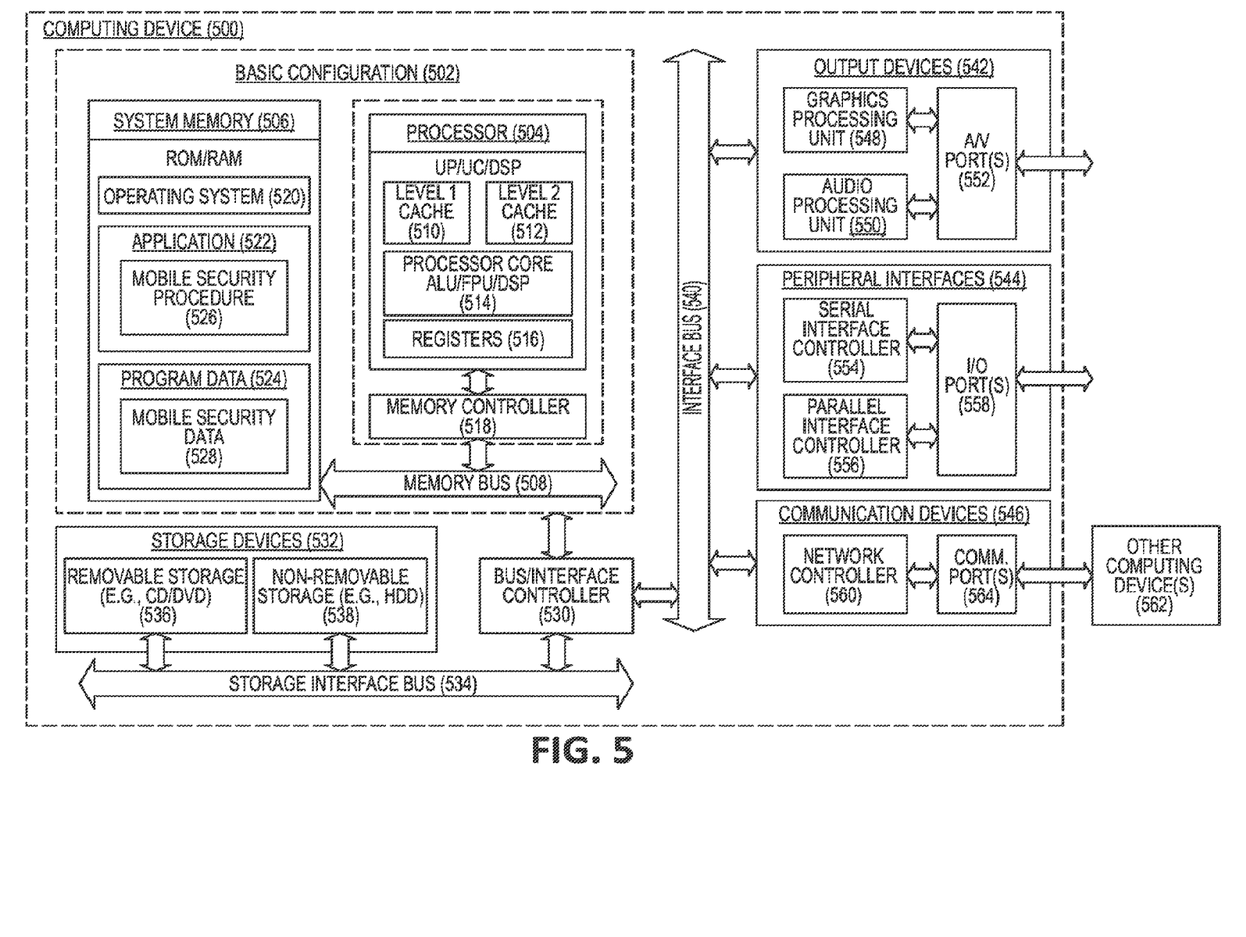
FIG. 5 is a block diagram illustrating an example computing device that is arranged for safety control, in accordance with at least some embodiments of the present disclosure.

FIG. 5 is a block diagram illustrating an example computing device 500 that is arranged for safety control, in accordance with at least some embodiments of the present disclosure, and could represent, for example, computer 108, computer 208, local computer 308, or cloud server 316. Additionally, the procedure of FIG. 4 may be executed on the example computing device of FIG. 5. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 910 and a level two cache 912, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a safety control procedure 526 that is arranged to perform the functions as described herein, including those described with respect to procedure 400 of FIG. 4. Program data 524 may include digital images 528 or other data types received from sensors that may be useful for analyzing compliance with safety precautions as is described herein. In some embodiments, application 522 may be arranged to operate with program data 524 on operating system 520 such that safety control is provided for a dangerous device. This described basic configuration 502 is illustrated in FIG. 9 by those components within the inner dashed line.

Computing, device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage or information, such as computer readable instructions, data structures, program modules, or other data.

System memory 506, removable storage devices 536 and non-removable storage devices 538 are examples of computer storage media. Computer storage media includes, but is not limited to RAM, ROM, EEPROM flash memory or other memory technology. CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interlace controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media ma typically be embodied by computer readable instructions, data structures, program modules, or other data in a modulated data signal, such as a carrier wave or other transport mechanism, and may include any information deliver media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A safety control system, comprising:
a device that is enabled or disabled by a safety signal;
a label affixed to the device, wherein the label includes content associated with the device, and wherein the content of the label indicates an internet address of instructions to detect safety conditions associated with the device;
one or more sensors operable to sense data associated with the device, with an environment of the device, and with the content of the label and to produce a signal indicative of the sensed data associated with the device, with the environment of the device, and with the content of the label; and
one or more computers communicatively coupled to the one or more sensors, wherein the one or more computers comprise at least one processor and at least one memory, and wherein the at least one memory stores thereon computer readable instructions that, in response to execution by the at least one processor, cause the at least one processor to perform operations that comprise:
detect, based on analysis of the signal produced by the one or more sensors, an existence or absence of one or more of the safety conditions associated with the device;
generate the safety signal based on detection of the existence or absence of the one or more of the safety conditions; and
send the safety signal to the device to enable or disable the device.

2. The safety control system of claim 1, wherein the one or more sensors comprise one or more cameras.

3. The safety control system of claim 1, wherein the device includes one of a welding device, a chainsaw, a forklift, or a welding torch.

4. The safety control system of claim 1, wherein the one or more safety conditions comprise an operational checklist to be completed, at least in part, prior to operation of the device.

5. The safety control system of claim 1, wherein the one or more safety conditions comprise a condition monitored during operation of the device.

6. The safety control system of claim 1, wherein the one or more safety conditions comprise one or more of:
whether an operator of the device is wearing safety gear or clothing;
whether an operating area around the device is clear of non-operational objects or humans other than the operator and work-objects on which the device is operating; and
whether an attribute of at least one of the work-object meets a requirement.

7. The safety control system of claim 1, wherein:
the one or more sensors are operable to sense another label and to send data indicative of the sensed another label to at least one of the one or more computers, wherein the another label is affixed to a work-object on which the device is to operate; and
the safety signal is generated based on content of the sensed another label.

8. The safety control system of claim 7, wherein the another label is indicative of at least one physical attribute of the work-object.

9. The safety control system of claim 1, wherein:
the one or more sensors comprise a camera worn or mounted on an operator of the device;
at least a first one of the one or more computers is worn or mounted on the operator of the device; and
the at least the first one of the one or more computers is configured to interoperate with at least a second one of the one or more computers which is wirelessly coupled to the at least the first one of the one or more computers.

10. A computer-implemented method for safety control of a device, the method comprising:
receiving, by a computer, at least one digital signal indicative of sampling or measurements of the device, of an environment of the device, and of content of a label affixed to the device, wherein the content of the label is indicative of a location of instructions pertaining to safety requirements associated with the device, wherein the safety requirements specify conditions under which the device is safely operable, and wherein the at least one digital signal is received from at least one sensor that is communicatively coupled to the computer;
obtaining, based on the at least one digital signal, the instructions pertaining to the safety requirements associated with the device;
determining at least one portion of the at least one digital signal that is relevant to at least one safety requirement of the safety requirements associated with the device;
analyzing the at least one portion to determine if the at least one safety requirement is met; and
based on the analyzing, sending a safety control signal to the device, wherein the device is configured to be disabled by the safety control signal when the at least one safety requirement is unmet.

11. The computer-implemented method of claim 10, wherein:
the at least one safety requirement is that an operator of the device is wearing specified clothing or equipment;
the at least one sensor comprises at least one camera;
the at least one digital signal comprises at least one digital image;
the determining includes identifying human figures or body parts in the at least one digital image; and
the analyzing includes detecting absence of the specified clothing or equipment in the at least one digital image.

12. The computer-implemented method of claim 10, wherein:
the at least one safety requirement is that a work-object which the device operates on or with meets a specified requirement;

the at least one sensor comprises at least one camera;
the at least one digital signal comprises at least one digital image;
the determining includes identifying the work-object or portion of the work-object in the at least one digital image; and
the analyzing includes detecting, in the at least one digital image, that the specified requirement is unmet.

13. The computer-implemented method of claim 10, wherein:
the at least one safety requirement is that a specified area around the device is substantially clear of people or objects other than an operator of the device and work-objects pertaining to the device;
the at least one sensor comprises at least one camera;
the at least one digital signal comprises at least one digital image;
the determining includes identifying boundaries of the specified area in the at least one digital image; and
the analyzing includes detecting, in the at least one digital image, the people or objects within the boundaries of the specified area.

14. The computer-implemented method of claim 10, wherein:
the at least one safety requirement is a limitation that pertains to a physical attribute of the work-object and within which the device may safely operate;
the at least one sensor is operable to sense another label affixed to the work-object and that indicates a value associated with the physical attribute of the work-object;
the at least one sensor comprises at least one camera;
the at least one digital signal comprises at least one digital image;
the determining includes identifying the another label in the at least one digital image; and
the analyzing includes:
determining the value indicated by the another label; and
verifying that the device in unsafe to operate if the value is determined to exceed the limitation.

15. A computing system, comprising:
one or more sensors operable to sense data associated with a device, with an environment of the device, and with content of a label affixed to the device, wherein the content of the label is indicative of a location of instructions pertaining to safety conditions associated with the device, and wherein the one or more sensors are further operable to produce a signal indicative of the sensed data associated with the device, with the environment of the device, and with the content of the label; and
at least one processor and at least one memory, wherein the at least one memory stores thereon computer readable instructions that, in response to execution by the at least one processor, cause the processor to perform operations that comprise:
retrieve, based on the signal produced by the one or more sensors, the safety conditions associated with the device;
detect, based on analysis of the signal produced by the one or more sensors, at least one safety condition of the safety conditions associated with the device;
generate a safety signal based on the detected at least one safety condition; and
send the safety signal to the device, wherein the safety signal is effective to enable or disable the device.

16. The computing system of claim 15, wherein the one or more sensors comprise one or more camera devices.

17. The computing system of claim 15, wherein the device includes one of a welding device, a chainsaw, a forklift, or a welding torch.

* * * * *

UNITED STATES PATENT AND TRADEMARK OFFICE
CERTIFICATE OF CORRECTION

PATENT NO. : 10,147,293 B2  
APPLICATION NO. : 14/425591  
DATED : December 4, 2018  
INVENTOR(S) : Ur Page 1 of 1

It is certified that error appears in the above-identified patent and that said Letters Patent is hereby corrected as shown below:

In the Claims

In Column 12, Line 3, please delete "in" and insert -- is -- therefor.

Signed and Sealed this
Fourth Day of February, 2020

Andrei Iancu
*Director of the United States Patent and Trademark Office*